No. 694,114. Patented Feb. 25, 1902.
W. T. SHRYOCK.
CAR TRUCK.
(Application filed June 4, 1901.)
(No Model.) 2 Sheets—Sheet 1.
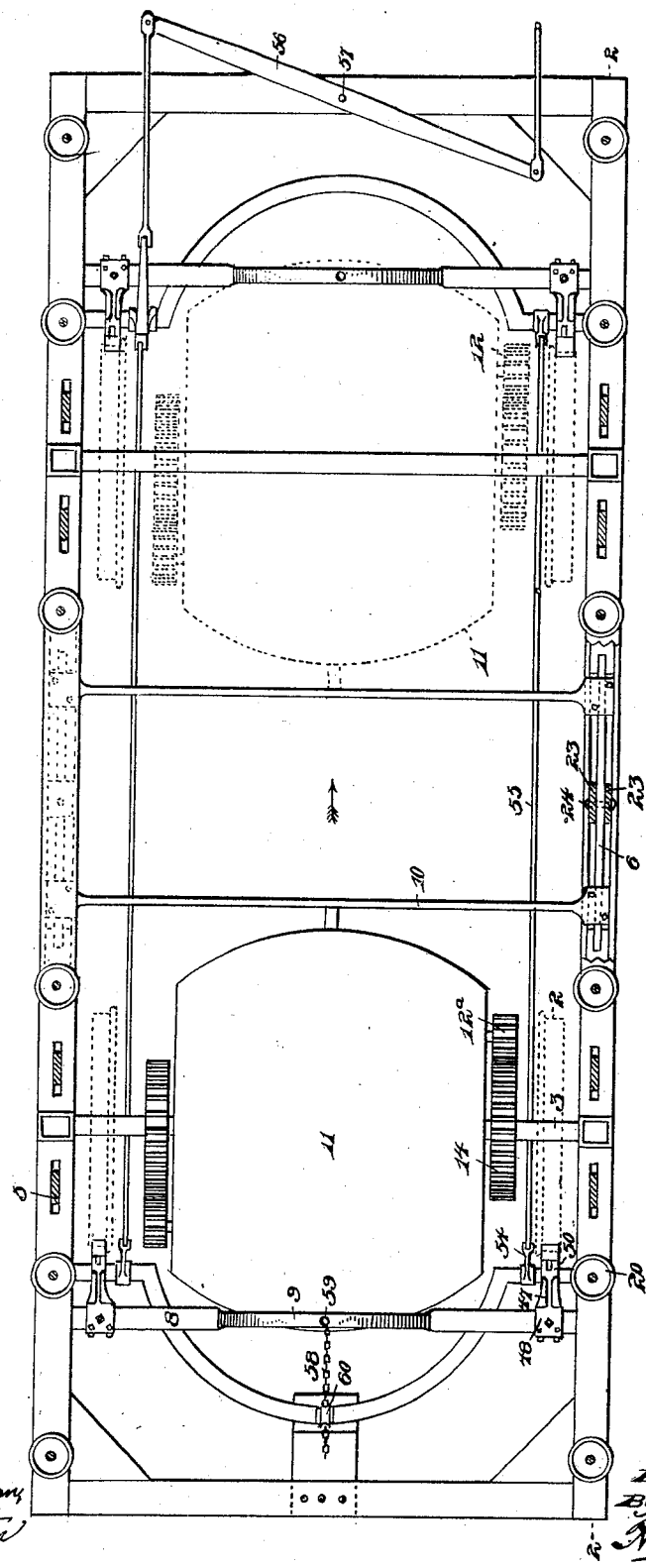

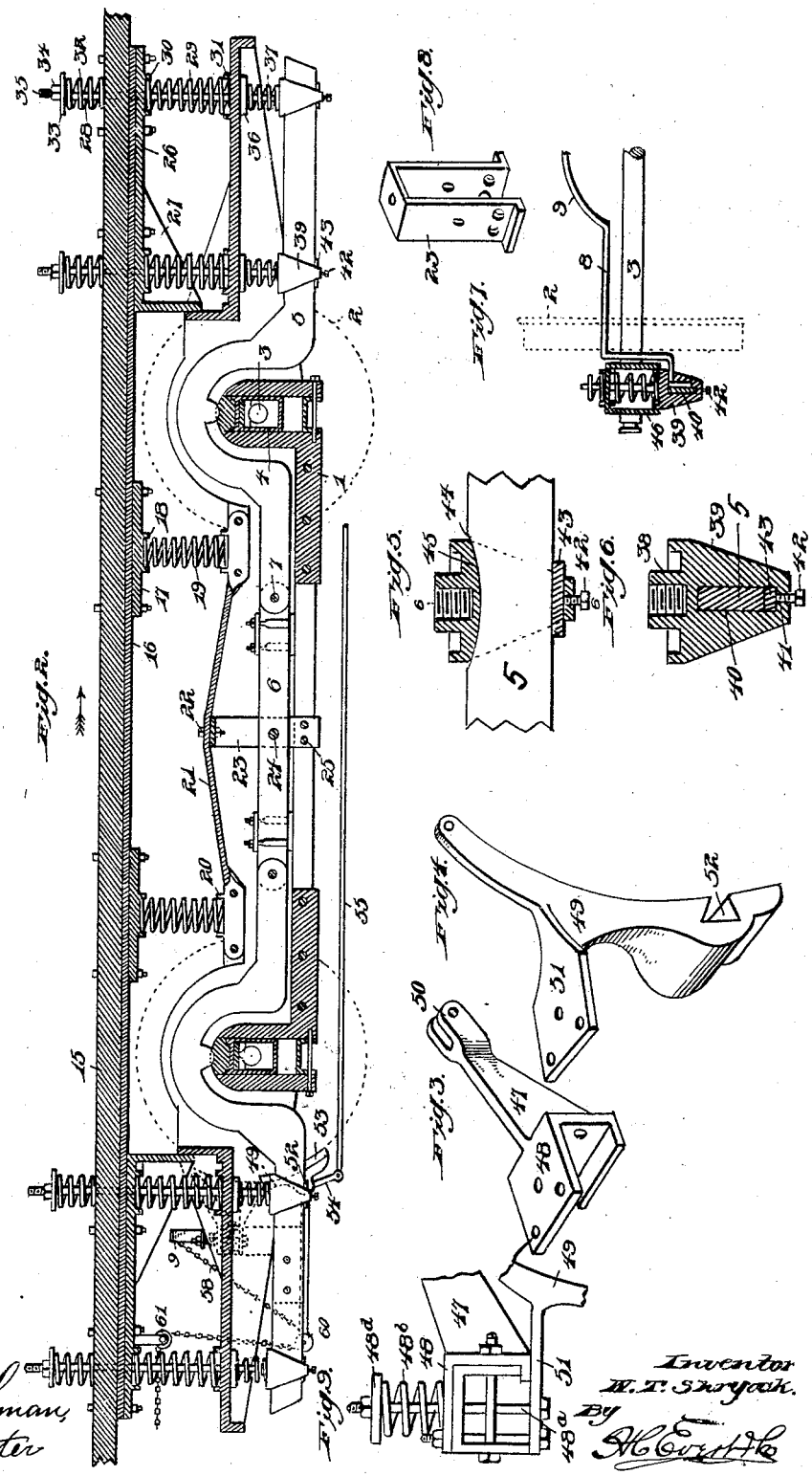

UNITED STATES PATENT OFFICE.

WILLIAM T. SHRYOCK, OF ALLEGHENY, PENNSYLVANIA.

CAR-TRUCK.

SPECIFICATION forming part of Letters Patent No. 694,114, dated February 25, 1902.

Application filed June 4, 1901. Serial No. 63,074. (No model.)

*To all whom it may concern:*

Be it known that I, WILLIAM T. SHRYOCK, a citizen of the United States of America, residing at Allegheny, in the county of Allegheny and State of Pennsylvania, have invented certain new and useful Improvements in Car-Trucks, of which the following is a specification, reference being had therein to the accompanying drawings.

This invention relates to certain new and useful improvements in trucks, and more particularly to the equalizing-frame upon which the single or twin motors are suspended.

The present invention aims to provide means for suspending the motors as well as for supporting the brake-shoes and hangers from the equalizing-frame.

Another object of this invention is to perfectly equalize the load of the motors, thereby obtaining a more uniform distribution of the electromotive force.

The herein-described invention further aims to provide novel means whereby the strain on the rear motor or motors of the car when ascending a grade is greatly relieved and whereby the load is more equally distributed between the forward and rearward motor or motors, thereby facilitating the traction on grades and during acceleration.

The invention also aims to center the load in the central portion of the truck and to retain the center of gravity at or near this point irrespective of the grade upon which the car travels; furthermore, to so arrange the rearward and forward motor or motors in certain relation to one another when ascending grades that the upward pressure of the rear motor or motors will have a tendency to bear the forward motor or motors downwardly, and when descending a grade the reverse action will take place, thereby obtaining at all times a more uniform strain upon both the rearward and forward motor or motors, as the case may be.

It will be noted that the herein-described invention of motor suspension and brake attachment may be easily applied to all standard forms of trucks now in use. In case twin motors are employed at the forward or rearward portion of the truck, it is the object of my invention to concentrate the power of the twin motors to a common axle by means of gearing, all of which will be hereinafter more full explained, and specifically pointed out in the claims.

In describing the invention in detail reference is had to the accompanying drawings, forming a part of this specification, and wherein like numerals of reference indicate corresponding parts throughout the several views, in which—

Figure 1 is a top plan view of my improved car-truck and attachments. Fig. 2 is a longitudinal sectional view taken on the line 2 2 of Fig. 1. Fig. 3 is a perspective view of one of the shoe-hanger brackets to which the shoe-hangers proper are secured. Fig. 4 is a perspective view of one of the shoe-hangers which carry the brake-shoe. Fig. 5 is a vertical sectional view of one of the supports for the rigid frame upon the flexible frame. Fig. 6 is a transverse vertical sectional view thereof, taken on the line 6 6 of Fig. 5. Fig. 7 is a vertical sectional view showing the attachments between the connecting-bars and flexible frame. Fig. 8 is a perspective view of the central connection between the flexible frame and the rigid frame of the truck. Fig. 9 is a detail view of the connection between the shoe-hanger bracket and the shoe-hanger.

In the drawings the reference-numeral 1 indicates the rigid frame.

2 indicates the wheels, and 3 the axles of the wheels, arranged in journal-boxes 4 and operating in the usual manner.

The reference-numerals 5 5 and 6 indicate the flexible frame, which is formed on each side of three parts. The parts 5 5 and 6 are pivotally secured together at 7.

The reference-numeral 8 indicates the connecting-bar, having a centrally-curved portion 9, this connecting-bar 8 serving to connect the parts 5 5 of the flexible frame together.

The reference-numeral 10 indicates suspension-bars connecting the parts 6 of the flexible frame together, from which bars the motors 11 are suspended. These motors are preferably arranged in pairs, the armature of one motor driving the pinion-wheel 12 and the armature of the other motor operating the pinion-wheel $12^a$. These pinion-wheels mesh with larger gears 14, fixed to the axle 4, and drive the same, thereby communicating a rotary movement to the wheels. It will be seen that by this construction the power from the twin motors is concentrated upon the common axle.

The reference-numeral 15 indicates the sill of the car, to which is secured the auxiliary truck-frame 16. To this truck-frame are rigidly attached plates 17, having formed therein seats 18 for the reception of springs 19, the lower ends of said springs being seated in recesses 20, formed upon the central portion 21 of the rigid frame. To this central portion 21 is centrally secured, as shown at 22, a central support 23, which is adapted to straddle the section 6 of the flexible frame and is pivotally secured thereto, as shown at 24. The lower ends of said central support are rigidly secured by means of bolts 22 25 to the rigid truck-frame 1.

The reference-numeral 26 indicates plates arranged on the under side of the auxiliary frame 16, the downwardly-extending portion 27 of said angular plates being adapted to abut and slide against the rigid frame. Rods 28 pass through elongated holes in the sill portion of the car, through the angular plates 26, and through the rigid frame 1. Springs 29 are interposed between the auxiliary portion of the truck-frame and the rigid frame encircling said rods, these springs being secured in seats 30 and 31, arranged on the angular plates and rigid frame. Springs 32 are secured on the upper face of the sill portion of the car and bear against washers 33, which are held in position by means of nuts 34, secured on the screw-threaded end 35 of the rods 28. Similar washers are arranged below the rigid frame, which are designated by the numeral 36. These washers are likewise secured on the rods 28 and are adapted to bear downwardly upon springs 37, encircling the lower end of the rod. The end of the rod is likewise screw-threaded to engage in the screw-threaded socket 38 of a cone-shaped support 39, having a central opening 40 formed therein to receive the parts 5 of the flexible frame. These cone-shaped supports are secured to each of the rods, eight in number, four on each side of the truck. The said cone-shaped supports have formed in the apex a screw-threaded opening 41 to receive an adjusting-screw 42, operating against the gibs 43, which allows the cone-shaped supports to be arranged in seats 44, provided on the flexible frame. The upper wall of the slot 40 is also curved, as shown at 45, for the purpose of seating itself in the seat 44.

The reference-numeral 46 indicates a feather portion of the rigid frame, forming a guide for the cone-shaped supports, and which forms a part of the flexible frame. The reference-numeral 47 indicates a bracket carrying an apertured fastening-plate 48. This bracket receives a brake-shoe hanger 49, which is pivotally secured in the bifurcated end 50 of the bracket 47. This brake-shoe hanger 49 also carries a perforated plate 51, through which plate and the apertured plate 48 is secured a bolt $48^a$. Around the top end of said bolt is a spring $48^b$, seated on the plate 48 of the bracket 47 and secured by a nut and washer $48^d$. The lower end of the brake-shoe hanger 49 has formed therein a dovetailed groove 52 to receive brake-shoes 53, which are suitably connected by levers 54, brake-rods 55, and operating-chains.

The bracket and hanger 47 and 49 are secured together to the cross-pieces 8, as shown in Fig. 1 of the drawings. A swiveled lever 56, secured at 57, shows one means for operating the brake, while chain 58, secured at 59, and passed under pulley 60 and over pulley 61, (shown in Figs. 1 and 2,) shows means of operating the brake when motors are supported outside the axles.

The many advantages obtained by the use of my improved device will be readily apparent from the foregoing description, taken in connection with the accompanying drawings, and it will be noted that various changes may be made in the details of construction without departing from the general spirit of my invention.

Having fully described my invention, what I claim as new, and desire to secure by Letters Patent, is—

1. In a car-truck, the combination of a rigid frame, an auxiliary frame, a flexible frame, and motors suspended from said flexible frame, substantially as described.

2. In a car-truck, the combination of a rigid, an auxiliary and a flexible frame, and motors suspended on each end of said flexible frame, substantially as described.

3. In a car-truck, the combination of a rigid and a flexible frame, twin motors suspended on each end of said flexible frame and geared to a common axle, substantially as described.

4. In a car-truck, the combination of a rigid, an auxiliary and a flexible frame, motors suspended on each end of said flexible frame, and brakes suspended from said flexible frame, substantially as described.

5. In a car-truck, the combination with a rigid frame, of a flexible frame supporting the rigid frame with its side rails formed in sections pivoted together, said flexible frame having the motors carried by the truck suspended therefrom, as and for the purpose described.

6. In a car-truck, the combination with a rigid frame, of a flexible frame supporting the rigid frame with its side rails formed in sections pivoted together, connections between the side rails of the flexible frame, and means for suspending the motors of the truck from said connections, substantially as described.

7. In a car-truck, the combination with a rigid frame, and an auxiliary frame carried thereby, of a flexible frame connected thereto with the motors of the truck suspended from said flexible frame, as and for the purpose specified.

8. The improvement in motor supension for car-trucks, comprising a truck having a rigid frame, a flexible frame supporting the rigid frame with each of its side rails formed in sections pivoted together, and means for suspending the motors of the truck from the flexible frame, substantially as described.

9. The improvement in motor suspension for car-trucks, comprising a truck having a rigid frame, a flexible frame supporting the rigid frame, cross-bars connecting the side rails of the flexible frame, and means for suspending the motors from the flexible frame, substantially as described.

10. In car-trucks, a rigid frame, and a flexible frame supporting the rigid frame with the truck-motor and truck-brakes suspended from the flexible frame, substantially as described.

11. In car-trucks, a rigid frame, an auxiliary frame carried thereby, and a flexible frame supporting the rigid frame with the truck-motors suspended from the flexible frame, substantially as described.

12. In a car-truck, the combination of a rigid frame, and a flexible frame having its side rails made in sections pivoted together, supports carried by the side rails of the flexible frame, rods connected to said supports and passing through the rigid frame, and springs on said rods between the rigid and flexible frames, substantially as described.

13. In a car-truck, a rigid frame, a flexible frame supporting the rigid frame with each of its side rails formed in sections pivotally connected together, a central support connecting the side rails of the flexible frame to the rigid frame, supports carried by the side rails of the flexible frame, and springs interposed between the side rails of the flexible frame and the side rails of the rigid frame, substantially as described.

14. A car-truck having a rigid frame, a flexible frame connected to the rigid frame, and springs interposed between the rigid frame and the flexible frame, combined with cross-bars connecting the side rails of the flexible frame, and means for suspending the truck-brakes and the truck-motor from the cross-bars, substantially as described.

In testimony whereof I affix my signature in the presence of two witnesses.

WILLIAM T. SHRYOCK.

Witnesses:
  JOHN NOLAND,
  E. E. POTTER.